Nov. 15, 1966     M. H. BIRNBOIM     3,286,176

ELECTRICAL PHASE METER AND AMPLITUDE COMPARATOR

Filed Oct. 21, 1964     4 Sheets-Sheet 1

INVENTOR
MEYER H. BIRNBOIM

BY Rupert J. Brady &
William L. Gates
ATTORNEY

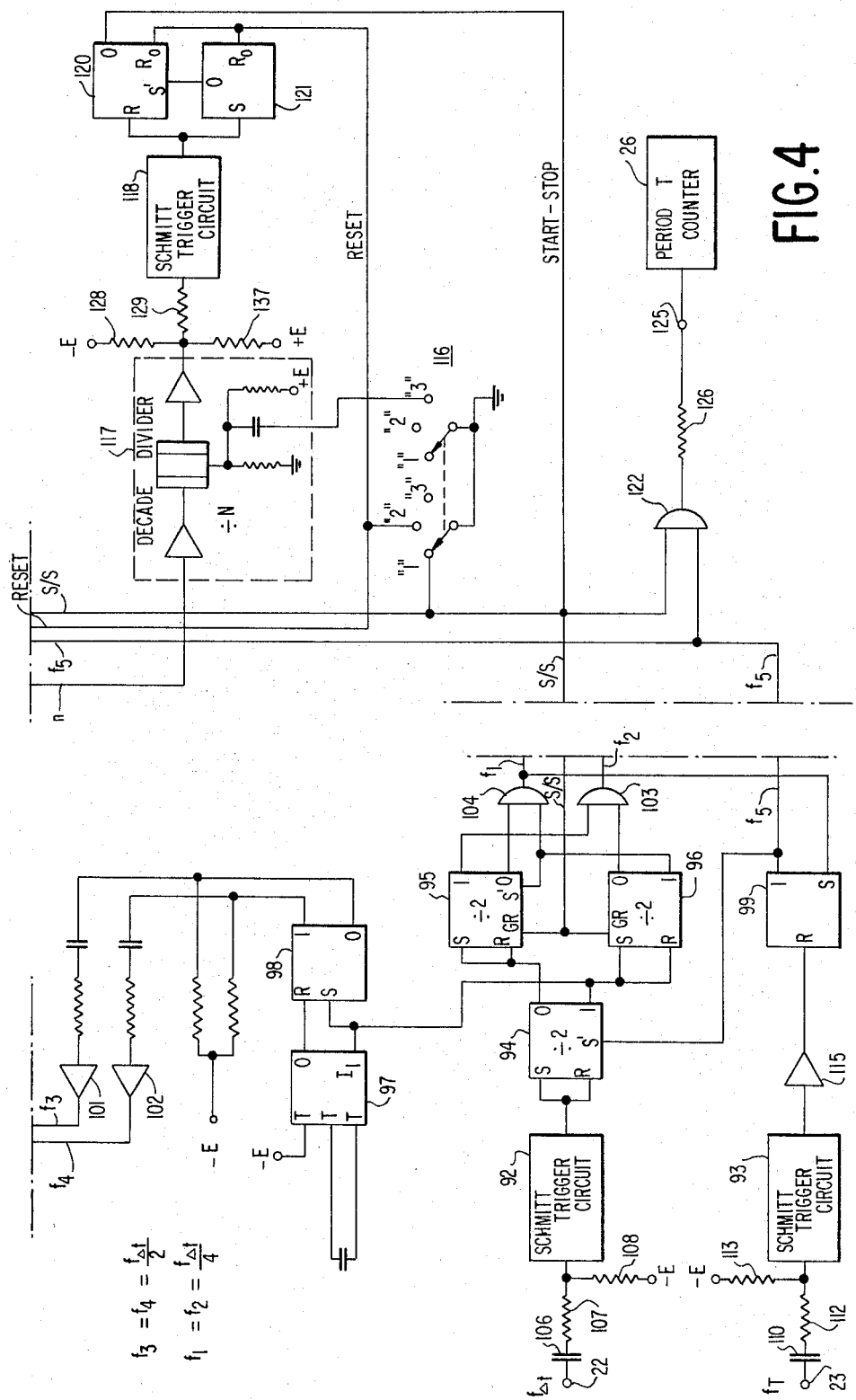

Nov. 15, 1966     M. H. BIRNBOIM     3,286,176
ELECTRICAL PHASE METER AND AMPLITUDE COMPARATOR
Filed Oct. 21, 1964                            4 Sheets-Sheet 4

INVENTOR
MEYER H. BIRNBOIM
BY *Rupert J. Brady*
*William L. Gates*
ATTORNEYS

United States Patent Office 3,286,176
Patented Nov. 15, 1966

3,286,176
ELECTRICAL PHASE METER AND AMPLITUDE COMPARATOR
Meyer H. Birnboim, Pittsburgh, Pa., assignor to Mellon Institute, Pittsburgh, Pa., a corporation of Pennsylvania
Filed Oct. 21, 1964, Ser. No. 405,413
14 Claims. (Cl. 324—83)

This invention relates to electrical measuring apparatus and more particularly to an instrument for the accurate measurement of the phase difference and relative amplitude between two electrical sinusoidal signals in the frequency range from 1000 cycles per second down to D.C.

Accurate measurement of the response of a system to a sinusoidally periodic stress creates specific problems in the low frequency range from 20 c.p.s. down to D.C. when the phase angle is very small. This situation is similar whether determining the motional response to a dynamic mechanical force in a viscoelastic polymer system, or determining the electric current response to a dynamic electric field in a dielectric material, or in servo system analysis. One must measure the relative amplitude and phase difference between two electric sinusoidal signals.

Conventional A.C. bridge techniques become impractical at low frequencies of 1 cycle per second or less due to component limitations and due to the protracted time required to obtain a balance. Recording techniques on the other hand do not provide sufficiently high angular resolution. Digital counter phase meters measure the time interval between the "zero crossover" points of the two sine waves and are accurate in principle; however, the non-ideality of both sine wave signals and triggering levels are known to introduce appreciable errors. For example, D.C. components and noise in the signals make the definition of "zero" voltage and "crossover" time ambiguous. A discussion of error sources in counter measurements can be found in the article, "Digits Can Lie," published in General Radio Experimenter, volume 36, No. 12, December 1962, pages 7–11 inclusive. Furthermore, in such instruments, no provision is made for amplitude determination.

In the idealized time interval measurement, two sine wave signals would be required which are free of distortion as well as being free of superposed noise, and free from base line drift (the mean value). Drift-free triggering levels would also be required. Typically in a dynamic mechanical experiment such non-idealities may be caused by: wide-band amplifier shot-noise, hum pickup, D.C. base line drift, drift in gain, non-linearity, distortion and D.C. drift in the driving force, transducer non-linearity, spurious excitation of mechanical system resonance by vibration, shot noise and D.C. drift of triggering levels. (In practice, all these undesired effects are superposed on the idealized signals and are not readily distinguishable. Collectively, then, all of these undesired effects are defined simply as noise and then noting the character of the noise, for example, noise whose spectrum is much less than the signal frequency and noise whose spectrum is approximately equal to the signal frequency but is not periodically related thereto, etc.).

It is an object of the present invention therefore to provide an improved instrument for the determination of the phase angle difference and relative amplitude between two sine waves.

It is another object of the present invention to provide an improved instrument for the determination of phase shift and the relative amplitude of two sine waves by digital techniques.

It is yet another object of the present invention to provide electrical measuring apparatus which can determine the phase shift between two sinusoidal input signals without the ambiguities of "zero crossover" being present.

Still another object of the present invention is to provide measuring apparatus for electrical signals in the frequency range from 1000 cycles per second down to D.C.

Yet another object of the present invention is to provide apparatus for measuring the phase angle and relative amplitude of two electrical sinusoidal signals by digital logic means.

Briefly, the subject invention provides a digital means for measuring the total mutually exclusive time during which two input sine waves exceed arbitrary reference voltage levels. To accomplish this, the sine waves are adapted to drive one or more tunnel diode trigger circuits which selectively produce pulse sequence outputs whenever the respective sine waves exceed predetermined reference voltages above and below the mean value. By suitably generating a time base structure and providing logic circuits coupled to the trigger circuits and the time base structure, a logic network is provided for determining on a per unit time interval basis the desired time intervals.

Other objects and advantages of the present invention will become hereinafter more evident as a reading of the following detailed description proceeds when read in conjunction with the following drawings in which:

FIGURE 3 is a block diagram further illustrative of the time base section of the preferred embodiment shown in FIGURE 1;

FIGURE 4 is a block diagram further illustrative of the start-stop section of the preferred embodiment shown in FIGURE 1, including the period counter;

FIGURE 5 is a schematic diagram of a first type of tunnel diode trigger circuit utilized by the subject invention;

FIGURE 6 is a schematic diagram of a second type of tunnel diode trigger circuit utilized by the subject invention;

Figure 1:
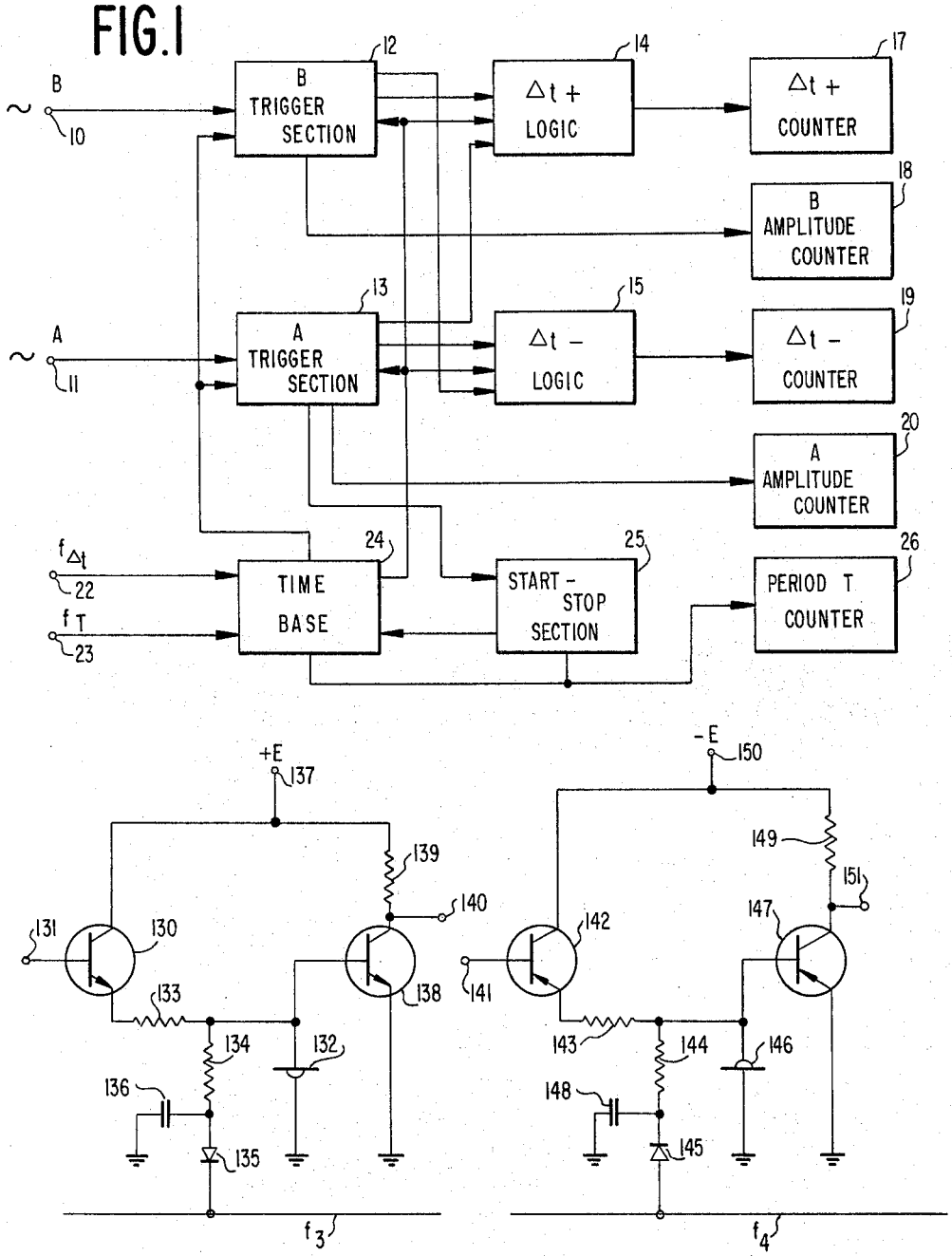
FIGURE 1 is a block diagram illustrative of the preferred embodiment of the subject invention.

Directing attention now to FIGURE 1, there is shown a pair of input terminals 10 and 11 to which is applied sine wave input signals B and A, respectively, from sine wave sources not shown. Input terminal 10 is coupled to B trigger section 12 and input terminal 11 is coupled to A trigger section 13. A third input terminal 22 is coupled to time base section 24 to which is applied a first timing signal $f_{\Delta t}$ from a stabilized frequency source such as a crystal oscillator, not shown. A fourth input terminal 23 is also coupled to the time base section 24 to which is applied a second timing signal $f_T$ from a timing source not shown. The trigger sections 12 and 13 are adapted to have inputs applied thereto from the time base section 24. B trigger section 12 is adapted to feed signals to the $\Delta t_+$ logic section 14 and the $\Delta t_-$ logic section 15 as well as signals to the B amplitude counter 18. A trigger section 13 is likewise adapted to feed signals to the $\Delta t_-$ logic section 15 and $\Delta t_+$ logic section 14. It also feeds signals directly to the A amplitude counter 20. The $\Delta t_+$ logic section 14 is coupled to the $\Delta t_+$ counter section 17 and the $\Delta t_-$ logic section 15 is coupled to the $\Delta t_-$ counter section 19. A start-stop section 25 is provided for initiating and terminating operation, both manually and automatically. It is adapted to receive an input from the A trigger section 13 and provides control signals to trigger sections 12 and 13 as well as the time base section 24. The period T counter 26 is adapted to be coupled to both the start-stop section 25 and the time base section 24 for measuring the total time interval of operation NT where N is number of cycles over which measurements are made and T is the period in seconds of one cycle of operation.

Although greater detail will be subsequently provided with regard to both apparatus and operation, a brief description of the purposes of the various units shown in FIGURE 1 will be presently provided. The time base section 24 operates to provide a proper time base structure from the timing signals $f_{\Delta t}$ and $f_T$. The trigger sections 12 and 13 are operable to provide selected pulse sequences synchronized by the time base section 24 whenever the respective input sine wave A or B reach and/or exceed predetermined voltage reference levels established in the trigger sections 12 and 13 respectively. To determine the phase angle between the two sinusoidal signals A and B, it is desirable to obtain the time difference between the peaks of the sine waves, however, an equivalent time $\Delta t$ can be obtained from the $\Delta t_+$ logic 14 and the $\Delta t_-$ logic 15 when the respective pulse sequences are accumulated in the $\Delta t_+$ and $\Delta t_-$ counters 17 and 19 and taking the difference thereof according to the relationship:

$$\Delta t = \Delta t_+ - \Delta t_- \quad (1)$$

The reason $\Delta t_+$ and $\Delta t_-$ are provided will be explained subsequently.

As indicated earlier, the relative amplitudes of the input sine waves A and B can be determined by the duration of time during which each sine wave exceeds a second predetermined voltage. This is accomplished by setting a preselected reference level for sine waves A and B and trigger sections 13 and 12 respectively which, when these levels are exceeded pulse sequences are generated. The A and B amplitude counters 20 and 18 respectively provide an indication of this time since the time base unit 24 estabilshes a per unit time interval for the respective pulse sequences. It is possible with apparatus substantially as shown in the basic block diagrammatic form shown in FIGURE 1 to measure the time difference between selected points of the two input sine waves, for example, the peaks of the sine waves, where the time difference is independent of both zero axis references and the relative amplitude of the signals.

Figure 7:
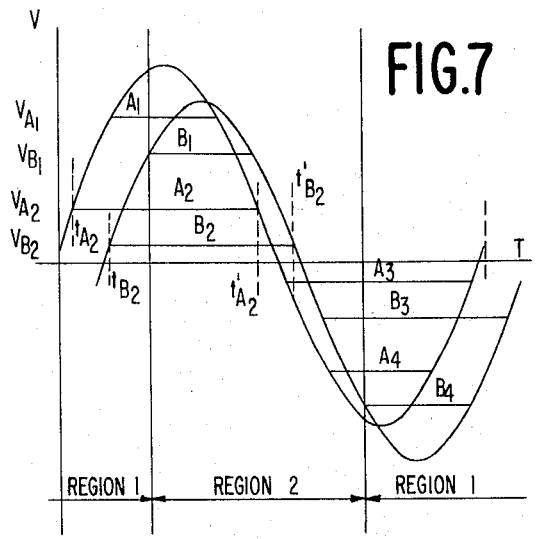
FIGURE 7 is a diagram helpful in understanding the operation of the subject invention.
Figure 8:
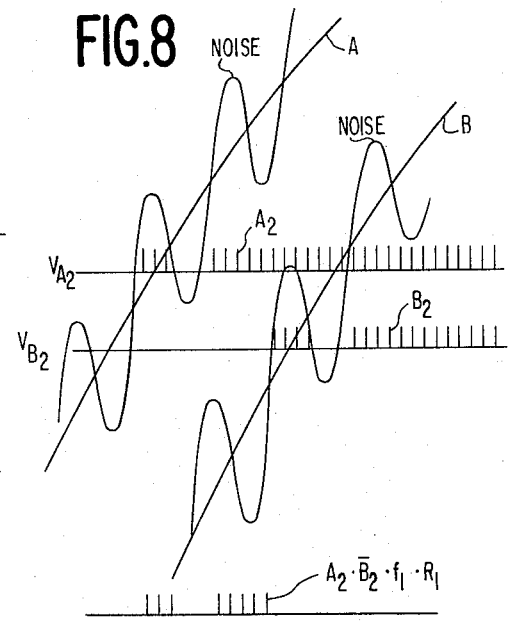
FIGURE 8 is another diagram helpful in understanding the operation of the subject invention.

The subject invention operates to measure phase difference in the following manner. The signals A and B are used to turn ON and OFF recycling triggers in trigger sections 13 and 12, respectively. So long as the voltage of signal A remains above a predetermined voltage level $V_{A_2}$, then the trigger will continue to recycle and yield a pulse sequence called, for purposes of illustration, as $A_2$; in the same way, signal B operates the recycling trigger output in trigger section 12 to produce a pulse sequence $B_2$ at the level $V_{B_2}$. FIGURES 7 and 8 illustrate this phenomenon. Curves A and B of FIGURE 8 are scaled up for purposes of illustration and additionally show the effect of noise on the sine waves A and B whose frequency is high compared to the sine waves. These pulse sequences are combined to obtain a time delay $\Delta t_+$ by counting up only those unit time intervals during a half cycle of the sine waves A and B as clocked by the time base 24, during which $A_2$ pulses occur and no $B_2$ pulses occur and during which no $A_2$ pulses occur and $B_2$ pulses occur and then averaging the two. Further, by defining regions $R_1$ and $R_2$ of sine waves (see FIGURE 7) for logic purposes and by properly synchronizing the time base structure by two time base signals $f_1$ and $f_2$ to prevent pulse overlap, the time $\Delta t_+$ can be expressed by the following logic equation:

$$\Delta t_+ = \frac{(A_2 \cdot \overline{B}_2 \cdot f_1 \cdot R_1) + (\overline{A}_2 \cdot B_2 \cdot f_2 \cdot R_2)}{2} \quad (2)$$

The logic "and" designation is notated by the dot and the bar designates the "not" function. Referring to FIGURE 7, Equation 2 then says that an output $\Delta t_+$ for the positive half cycle of sine waves A and B will be the pulse count during which the $A_2$ trigger circuit is producing pulses and the $B_2$ trigger circuit is not producing pulses and the signals are in the region $R_1$ of the sine wave and being under the control of time base $f_1$; and during which the $A_2$ trigger circuit is not producing pulses and the $B_2$ trigger circuit is producing pulses while the sine waves are in the region $R_2$ and being under the control of time base $f_2$; all divided by two. FIGURE 8 is illustrative of the first term of Equation 2 wherein the sine waves are in the first quadrant (0–90°). The second term of Equation 2 is produced in the second quadrant (90°–180°) of the sine waves A and B. It is the averaging of the pulse count at the beginning and end of the half cycle of the sine waves A and B which makes the measurement independent of the base line and the other properties of the sine wave.

It should also be appreciated that the same procedure can be repeated for the negative half cycle of the sine waves A and B as will be evidenced subsequently, regarding sequences $A_3$ and $B_3$.

Considering now the term $\Delta t_+$, in the measurement of small phase angles, an apparent negative phase angle $\Delta t_-$ can occur because of noise or due to a vertical displacement of one sine wave with respect to the other when their mean voltages (zero base line) are not equal. It would be possible that signal B would appear to lead signal A during one region of the sine wave in which case the time delay desired would then be expressed by the logic equation:

$$\Delta t_- = \frac{(\overline{A}_2 \cdot B_2 \cdot f_2 \cdot R_1) + (A_2 \cdot \overline{B}_2 \cdot f_1 \cdot R_2)}{2} \quad (3)$$

In the second region $R_2$ (see FIGURE 7), these effects appear to make signal B appear to lag behind signal A. By counting the pulses indicative of $\Delta t_-$ and subtracting if from the pulse count indicative of the $\Delta t_+$, the effect of these errors is corrected to obtain the true $\Delta t$ according to Equation 1. The phase angle between signals A and B then would be calculated by the equation $\delta = w\Delta t$ radians, where $w$ is equal to $2\pi F$, where F is the frequency of the sine wave and $\Delta t$ is the required time delay.

Regarding the measurement of the relative amplitude between sine waves A and B, it has been noted above that a determination is made in terms of the clipping level voltages and the duration of time during which the sine waves exceed these voltages. For example, referring to FIGURE 7, the clipping level voltages for amplitude determination for input signal A is designated $V_{A_1}$ and $V_{A_4}$ for the positive and negative portions of the sine wave such that the magnitude of $V_{A_1}$ is approximately equal to $-V_{A_4}$. In the same manner, the input signal B has predetermined clipping levels $V_{B_1}$ and $V_{B_4}$ which are chosen such that $V_{B_1}$ is approximately equal to $-V_{B_4}$. Also the clipping levels of both sine waves are made to be substantially equal to one another. It can be shown that the relative amplitudes of sine waves A and B can be expressed by the following equation:

$$\frac{A}{B} = K_1 \times K_2 \frac{\cos \frac{\pi}{2} \times \frac{B_1+B_4}{T}}{\cos \frac{\pi}{2} \times \frac{A_1+A_4}{T}} \quad (4)$$

where $B_1$ and $B_4$ is indicative of the pulse sequence for sine wave B, significant of the number of time unit intervals during which the sine wave B exceeds the clipping levels $V_{B_1}$ and $V_{B_4}$, respectively, and where $A_1$ and $A_2$ represents the pulse sequence indicative of the time of the time interval sine wave A exceeds the voltages $V_{A_1}$ and $V_{A_4}$, respectively, and T is the total period of the sine waves. In practice, $K_1$ and $K_2$ is approximately equal to 1 when the clipping levels for sine waves A and B are the same in each instance. The time interval for $B_1$ and $B_4$ are counted in the B amplitude counter 18 while the time interval $A_1$ and $A_4$ is accumulated in A amplitude counter 20. The period T is determined by the period T counter 26.

Figure 2:
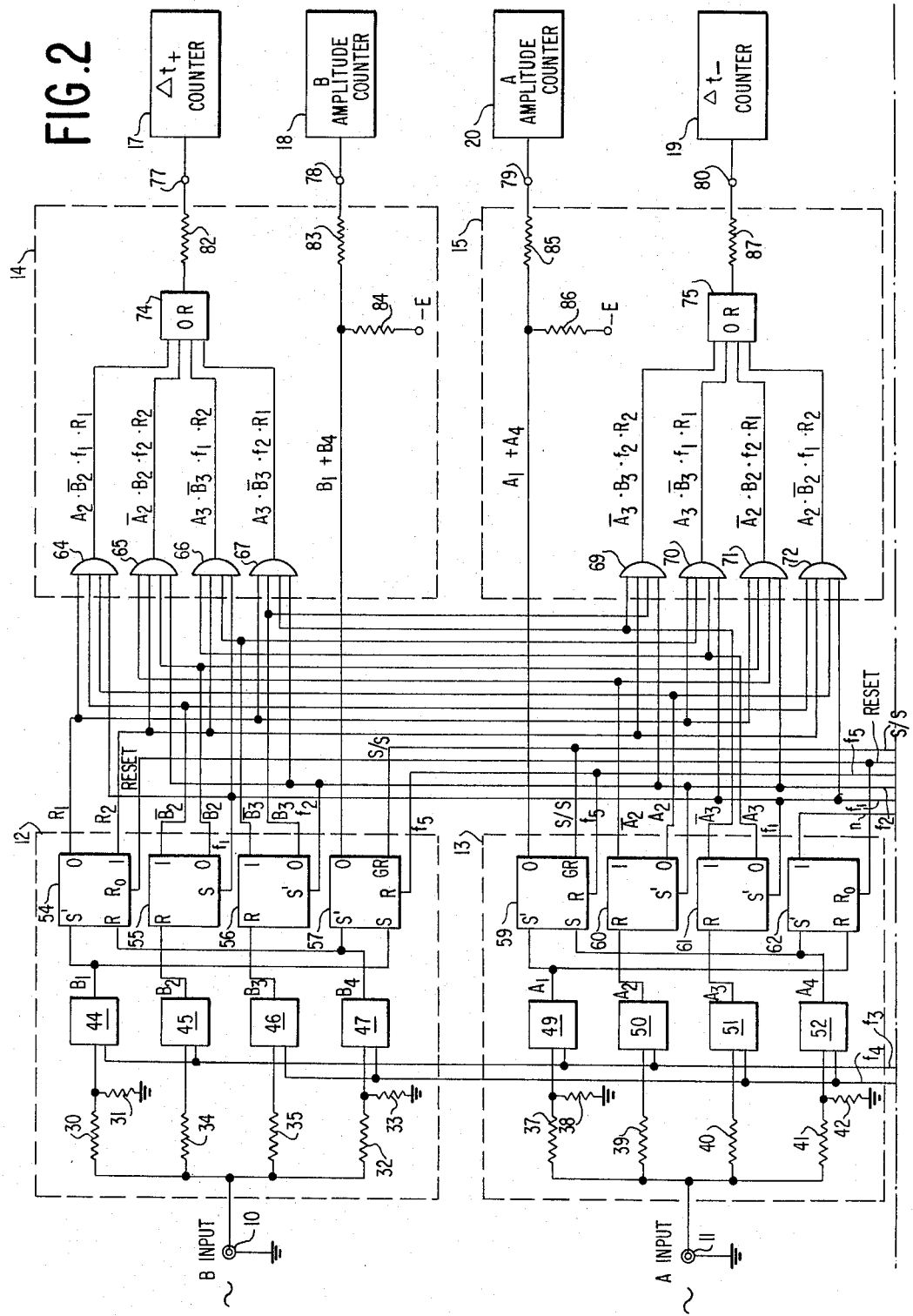
FIGURE 2 is a block diagram further illustrative of the trigger and logic sections of the preferred embodiment shown in FIGURE 1.

Now going into further detail, reference to FIGURE 2 illustrates the A and B trigger sections 12 and 13 and the logic circuitry $\Delta t_+$ 14 and $\Delta t_-$ 15 as well as the respective associated counters. As in FIGURE 1, input sine waves A and B are applied to input terminals 11 and 10 respectively. Considering first the circuitry associated with signal A, the A trigger section 13 comprises four separate signal paths. The first signal path couples a tunnel diode circuit 49 illustrated for example in FIGURE 5 to input terminal A by means of a resistance attenuator circuit including resistors 37 and 38. Also coupled to the tunnel diode circuit 49 is a time base input $f_3$ directed along circuit lead labeled $f_3$. The output of tunnel diode circuit 49 comprises a pulse sequence of $A_1$ which is coupled into flip-flop circuit 59 at the input S' thereof. The second signal path for signal A is to a second tunnel diode circuit 50, (FIGURE 5) coupled to the input terminal 11 by means of resistor 39. The tunnel diode circuit 50 also is adapted to receive a time base input $f_3$. The output thereof is a pulse sequence $A_2$ and is applied to input R of flip-flop circuit 60. The third signal path comprises a third tunnel diode circuit 51 illustrated for example in FIGURE 6 coupled to the input terminal 11 by means of resistor 40 which has its output pulse sequence $A_3$ coupled to the input R of flip-flop 61. Tunnel diode circuit 51 moreover has a time base $f_4$ applied thereto over a circuit lead labeled $f_4$. Lastly, the fourth current path comprises a fourth tunnel diode circuit 52 (FIGURE 6) coupled to the input terminal 11 by means of the attenuator circuit comprising resistors 41 and 42. Similarly with respect to tunnel diode circuit 51, tunnel diode circuit 52 is also fed a time base $f_4$. The output pulse sequence $A_4$ is coupled first to the S' input to flip-flop circuit 62 and also to input terminal S of flip-flop circuit 59. Pulse sequence $A_1$ moreover is also coupled to flip-flop circuit 62 by means of a circuit lead from the output of tunnel diode circuit 49 to input terminal R of flip-flop circuit 62.

Regarding signal B, the above-mentioned circuitry with respect to signal A is duplicated such that four tunnel diode circuits 44, 45, 46 and 47 are coupled to input terminal 10 for providing output pulse sequences $B_1$, $B_2$, $B_3$ and $B_4$ respectively. Similarly, output pulse sequence $B_1$ is coupled to S' input of flip-flop 54 and the S input terminal of flip-flop 57. Pulse sequences $B_2$ and $B_3$ are respectively coupled to input terminal R of flip-flops 55 and 56 while pulse sequence $B_4$ is coupled to the S' input of flip-flop 57 and the R input of flip-flop 54.

It should be pointed out that tunnel diode circuits 44, 45, 49 and 50 are of the same type as illustrated in detail in FIGURE 5. These circuits moreover, are designed to be responsive to positive polarity input signals. Tunnel diode circuits 46, 47, 51 and 52 are tunnel circuits of a second type as illustrated in FIGURE 6 which are responsive to negative polarity signals.

Tunnel diode circuit 50 with its associated flip-flop circuit 60 and tunnel diode circuit 51 and its flip-flop circuit 61 are utilized with respect to signal A in the desired phase measurement function of the subject invention whereas tunnel diode circuits 45 and 46 with their associated flip-flops 55 and 56 respectively are utilized with respect to input signal B. The two flip-flop circuits 59 and 62 associated with tunnel diode circuits 49 and 52 respectively are utilized for the amplitude measurement of signal A and for generating an automatic start-stop feature. Flip-flop circuit 57 is utilized for the amplitude measurements of signal B while flip-flop circuit 54 defines regions $R_1$ and $R_2$ of the sine waves which will be discussed in greater detail subsequently.

The four flip-flop circuits 55, 56, 60 and 61 which are utilized for phase measurements of sine wave input signals A and B are adapted to provide two outputs which are a selected pulse sequence and its complement, for example, $A_2$ and $\overline{A}_2$, synchronized by one of the time bases $f_1$ or $f_2$. More particularly flip-flop circuits 55 and 61 are adapted to be synchronized by time base $f_1$ applied to the S and S' inputs respectively from lead labeled $f_1$. Flip-flop circuits 56 and 60 are adapted to be synchronized by a time base $f_2$ applied to the respective input terminals $s'$.

Flip-flop circuits 54 and 62 moreover are adapted to have a reset pulse applied thereto at terminal $R_0$ from the start-stop section 25 over the "reset" lead, while the flip-flops 57 and 59 receive reset signals from a fifth time base $f_5$ from the time base section 24 by circuit lead $f_5$.

The logic circuitry comprises a $\Delta t_+$ logic 14 and a $\Delta t_-$ logic section 15, both comprised of four AND gates and one OR gate. More particularly, the $\Delta t_+$ logic section comprises AND gates 64, 65, 66 and 67 coupled to the OR gate 74 which in turn is coupled to the output terminal 77 by means of a resistor 82. Each of the AND gates have four selected inputs. For example, AND gate 64 receives an $R_1$ input from flip-flop 54, a $\overline{B}_2$ input from flip-flop circuit 55, an $A_2$ input from flip-flop circuit 60, and an $f_1$ input from time base 24 of FIGURE 1. The $\Delta t_-$ logic section 15 is comprised of AND gates 69, 70, 71 and 72 coupled to the OR gate 75 which is coupled to the output terminal 80 through resistor 87. Again, each AND gate is adapted to have four inputs from selected flip-flop circuits of the two trigger sections and a time base signal from time base 24. The operation of the logic circuitry in relation to the associated trigger sections under the control of the various time base signals will be hereinafter explained more fully.

Referring now to FIGURE 3 which is a detailed block diagram of the time base section 24 of FIGURE 1, it is shown comprising a pair of input terminals 22 and 23 to which are applied time base signals $f_{\Delta t}$ and $f_T$, respectively, from highly stable clock sources not shown. The signal $f_{\Delta t}$ is coupled to a Schmitt trigger circuit 92 by means of coupling capacitor 106 and a resistance voltage divider circuit comprising the resistors 107 and 108. The output of the Schmitt trigger circuit 92 is fed to inputs S and R of flip-flop circuit 94. The output terminal 1 of flip-flop 94 is simultaneously fed to the S and R inputs of flip-flop circuit 96 as well as the S input of flip-flop circuit 98 and the $I_1$ input to a time delay multi-vibrator 97. The 0 output of flip-flop circuit 94 is fed to the S and R inputs of flip-flop circuit 95. The 1 output terminal of flip-flop circuit 95 is fed to one input of the AND gate 103 while the 0 output terminal thereof is fed to one input of AND gate 104. The 0 output of flip-flop circuit 96 is fed to the other input of AND gate 103 while the 1 output of flip-flop circuit 96 is fed to the other input of AND gate 104. The outputs of AND gates 103 and 104 comprise time base signals $f_1$ and $f_2$, respectively, and have a frequency of $f_{\Delta t}/4$. The outputs from the 0 and 1 terminals of flip-flop circuit 98 are fed to amplifier circuits 101 and 102, respectively, for providing time base signals $f_3$ and $f_4$, respectively, and have a frequency of $f_{\Delta t}/2$.

The signal $f_T$ applied to terminal 91 is coupled to the Schmitt trigger circuit 93 by means of a coupling capacitor 110 and the resistance voltage divider network comprising resistors 112 and 113. The Schmitt trigger 93 output is fed to an amplifier circuit 115 and then to a flip-flop circuit 99 which provides an output which is time base $f_5$. It is also coupled back to the S' terminal of flip-flop circuit 94. Flip-flop circuit 99 also receives an input from the AND gate 103 at terminal S.

Figure 9:
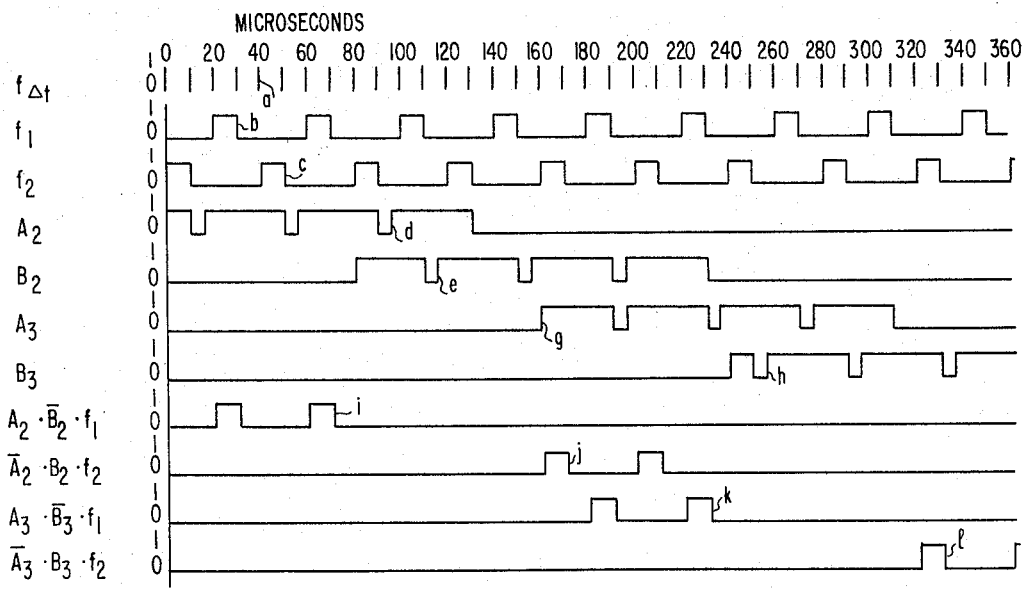
FIGURE 9 is a diagram of wave forms generated by the apparatus comprising the subject invention and is helpful in understanding the logic section thereof.

In operation, the time base circuitry operates to produce the five synchronized time bases $f_1$, $f_2$, $f_3$, $f_4$ and $f_5$ as follows. The time base signals $f_{\Delta t}$ having a frequency of, for example, 100 kc. (kilocycles per second) is shaped into a square wave pulse train by means of the Schmitt trigger circuit 92. Flip-flop circuit 94 divides the 100 kc. by a factor of 2 providing a 50 kc. input to the flip-flops 95 and 96 and 98. Flip-flop circuits 95 and 96 again divide the signal by a factor of 2 providing inputs to the AND gates 103 and 104 of 25 kc. Due to the interconnection of the inputs to AND gates 103 and 104, the outputs $f_1$ and $f_2$ are synchronized 25 kc. timing signals 180° out of phase with one another. FIGURE 9 is helpful in understanding this waveform generation and is illustrated thereat as curves $b$ and $c$. The 50 kc. signal applied to the S input of flip-flop circuit 98 drives the circuit to produce a 50 kc. output $f_3$ and $f_4$ at terminals 0 and 1 which when fed to amplifiers 101 and 102, respectively, are amplified to provide reset pulses of sufficient amplitude to reset the tunnel diode circuits in the trigger sections 12 and 13. The time delay multi-vibrator 97 returns flip-flop 98 to its normal state 5 microseconds after every pulse received from flip-flop circuit 94. The time base $f_3$ provides a reset trigger for the tunnel diode circuits 44, 45, 49 and 50 which are responsive to the positive input signals while the time base $f_4$ applies a reset signal to the tunnel diode circuits 46, 47, 51 and 52 respectively.

The time base input $f_T$ may be, for example, a 10 kc. pulse train. It is shaped up into a square wave pulse train in the Schmitt trigger circuit 93 and is amplified in amplifier 115. After being amplified, it is fed to flip-flop circuit 99 as a reset pulse which is being set by the time base $f_1$ to produce an output $f_5$ which is locked to $f_1$ and $f_2$ but having a frequency equal to $F_T$. The time base circuitry then produces two time bases $f_1$ and $f_2$ which are interlaced for driving selected flip-flops in the trigger sections and the logic circuitry while two 50 kc. time bases $f_3$ and $f_4$ continually recycle the tunnel diode circuits and finally the 10 kc. time base $f_5$ is used to control the flip-flops used for amplitude determination and for determination of the period T of the sine waves as will be subsequently shown.

With reference to FIGURE 4, the start-stop section of the subject invention comprises a control switch 116 having three positions: position 1 for manual start; position 2 for manual stop; and position 3 for automatic start-stop operation. In addition, a decade divider unit 117 is coupled from the output of flip-flop 62, FIGURE 2, by lead $n$ to a Schmitt trigger circuit 118 through the resistor network comprising resistors 128, 129 and 137. The output of the Schmitt trigger 118 is fed to the flip-flop circuits 120 and 121. The output (terminal 0) of flip-flop circuit 120 is fed by means of circuit lead $s/s$ to the AND gate 122 as well as to the G terminals of flip-flops 95 and 96 of the time base unit 24. It is also coupled to switch 116 and to the $G_R$ terminal of flip-flop circuit 57 and flip-flop circuit 59 in trigger sections 12 and 13 respectively. AND circuit 122 receives as another input the time base $f_5$ and the output thereof is fed to terminal 125 through resistor 126. Terminal 125 is then coupled to a period T counter whereby the action of the AND gate 122 will provide a series of pulses during a desired measurement time period so that a determination can be made by means of the period T counter 26 of the period T of the sine waves A and B and consequently the frequency thereof.

The N decade divider unit 117 is adapted to count the pulse sequence from flip-flop circuit 62 and will start at a predetermined defined time beginning at the first $A_1$ pulse from tunnel diode circuit 49 provided it has seen one $A_4$ pulse from tunnel diode circuit 52 first. The first pulse input to the decade divider unit 117 will automatically provide an enabling reset pulse to flip-flop circuits 54 and 62 while N cycles later the flip-flops 120 and 121 will change state signifying the number of N cycles of the inputs A and B. The start-stop operation can be accomplished either manually or automatically. The automatic mode insures starting and stopping at a correct part of the signal cycle following the "enable" operation and permits resetting the instrument to average over 10, $10^2$ or $10^3$ cycles of signal frequency. As noted, the starting point is defined to be the first $A_1$ pulse following at least one $A_4$ pulse; the stopping point is defined in the same way N cycles later. The number N is determined by the switching among the three decade divider units 17. It is necessary to initially reset these units to 9 rather than 0 since N cycles creates $N+1$ pulses.

Prior to explaining the operation of the subject invention in greater detail, the tunnel diode trigger circuits should be examined. FIGURE 5 is a schematic diagram illustrative of the type of tunnel diode circuit which is responsive to positive polarity input signals and which is utilized in the subject invention for tunnel diode circuits 44, 45, 49 and 50. Shown therein is a first NPN transistor 130 having its base electrode coupled to terminal 131 while its collector electrode is connected directly to a positive supply potential applied to terminal 137 from a supply source not shown. The emitter electrode is connected to the cathode electrode of tunnel diode 132 through resistance 133. The anode electrode of tunnel diode 132 is connected directly to a point of reference potential illustrated as ground. The circuit thus formed is an emitter follower limiter circuit with the tunnel diode connected as part of the load in the emitter circuit. Coupled to the anode electrode of the tunnel diode 132 is a resistor 134 which is coupled to a negative reset signal comprising time base $f_3$ by means of the diode 135 which is poled to pass only negative pulses at the anode of the tunnel diode while blocking all positive signals. A capacitor 136 has an end conected to ground while the other end is connected to the anode electrode of diode 135 and which is common to the resistor 134. A second NPN transistor 138 has its base electrode connected to the cathode electrode of the tunnel diode 32 while its emitter is returned to ground. A load resistor 139 is connected between the collector electrode and terminal 137. The output terminal 140 is connected directly to the collector electrode of transistor 138.

The operation of the tunnel diode is presently well known to those skilled in the art. Briefly, the tunnel diode is a semiconductor device which is adapted to have two stable operating states, a low voltage state and a high voltage state. When the tunnel diode is biased so that its normal operating point is in the low voltage state, the tunnel diode can be triggered to its high voltage state by an input current which exceeds a predetermined threshold level. This switching occurs very rapidly and the tunnel diode will maintain the high voltage state until such time that it is reset into its low voltage state by either opening the circuit or reducing the input drive below a minimum sustaining level so that it is forced back to its low voltage state.

In operation, the circuit in FIGURE 5 is adapted to be responsive to positive polarity signals applied to the base of transistor 130 by means of the input terminal 131. The transistor operates as an emitter follower limiter to limit the input signal to a level which reduced tunnel diode heating and prevents overload. The input signal is coupled to the tunnel diode 132 by means of resistor 133 and is adapted to be triggered to its high voltage state when the input signal at terminal 131 exceeds a predetermined level for example, 1 volt. This defines a first predetermined amplitude level since an emitter follower is substantially a unity gain amplifier and the resistance value of resistor 133 is selected so that sufficient current is fed to the tunnel diode to exceed its threshold level at that value of input signals. This change of voltage is amplified in transistor 138 and appears at terminal 140. As long as the input signal remains above the 1 volt level, the tunnel diode will tend to remain in its high voltage state; however, the action of the negative reset voltage $f_3$ applied to the tunnel diode through the diode 135 and resistor 134 acts to periodically recycle the tunnel diode, i.e., the tunnel diode is periodically returned to its low voltage state. Therefore, if the input voltage remains below the 1 volt level necessary to trigger the tunnel diode, the tunnel diode will remain in its low voltage state and the negative reset voltage from the time base $f_3$ will have no effect, but upon the switching of the transistor to its high voltage state when the input signal exceeds the 1 volt triggering level, the tunnel diode will be periodically recycled, i.e., returned to its low voltage state by the time base $f_3$, thereby producing a pulse sequence whenever the input signal exceeds the predetermined 1 volt level.

It is well known by those skilled in the art that the triggering or threshold point of a tunnel diode is reasonably sharp; however, it is also well known that there is a lot of scatter in this point and is somewhat noisy, i.e., the point changes in a random manner, but an average measurement of this point proves to be a stable value. In the present invention, there is no way of distinguishing the noise in this threshold level from the noise in the sine wave. It is significant, however, the tunnel diode 135 is purposely recycled at regular intervals so that the noise in a level does get averaged and in that particular sense averages any uncertainty in its own clipping level as well as any noise in the sine wave to become a stable voltage detector. In summary then, this recycling method has changed the tunnel diode from what might be considered a relatively unstable D.C. level detector to one which is stable.

With respect to FIGURE 6, there is shown a first and a second PNP-type transistor 142 and 147 coupled to tunnel diode 146 and is in all respects like the circuit shown in FIGURE 5 with the exception that the polarity of the tunnel diode is reversed. Similarly, the diode 145 is coupled to the tunnel diode 146 such that only positive voltages are transferred to the tunnel diode 146 for resetting operation.

The operation of the circuit shown in FIGURE 6 is in all respects identical to the circuit shown in FIGURE 5, the only difference being that whereas the circuit in FIGURE 5 is responsive to positive input signals, the circuit shown in FIGURE 6 is adapted to be responsive to negative polarity input signals applied to terminal 141. The two circuits are identical with the exception that the first uses a positive supply potential whereas the second uses a negative supply potential. The first circuit uses NPN-type transistors and the second uses PNP-type transistors and the tunnel diode connection and the reset diode connections are merely reversed.

Considering now the operation of the present invention in greater detail, when sinusoidal input signals are applied, sinusoidal signals A and B are applied to input terminals 11 and 10, respectively, pulse sequences $A_1$, $A_2$, $A_3$ and $A_4$ will be produced when the amplitude of signal A exceeds a substantially 1 volt level for tunnel diode circuits 50 and 51 producing pulse sequences $A_2$ and $A_3$ in a manner as described with respect to the circuits shown in FIGURES 5 and 6. The tunnel diode circuits 49 and 52, however, will not be triggered at the same level as tunnel diode circuits 50 and 51 due to the respective attenuator circuits comprising resistors 37 and 38 at the input of tunnel diode circuit 49 and the resistors 41 and 42 at the input of tunnel diode circuit 52. The input level therefore for triggering tunnel diode circuits 49 and 52 will be selectively higher, for example, a 6 volt level would be required before pulse sequence $A_1$ and $A_4$ would be produced. The tunnel diode circuits 44, 45, 46 and 47 which are responsive to the input sine wave B is in all respects identical to tunnel diode circuits 49, 50, 51 and 52, respectively, with correspondingly identical voltage levels. Reference to FIGURE 7 will illustrate this more fully. Shown therein, are two sine waves A and B of substantially the same amplitude with their mean values (zero crossover level or baseline) being separated from one another for purposes of illustration. Further, sine wave B is shown to lag sine wave A. An examination of FIGURE 7 shows that when the amplitude of sine wave A exceeds a predetermined voltage $V_{A_2}$, the $A_2$ pulse sequence from tunnel diode circuit 50 will be produced. In a like manner, when the amplitude of sine wave B exceeds the voltage level $V_{B_2}$, the $B_2$ pulse sequence will be produced by tunnel diode circuit 45. For the negative halves of the sine waves, pulse sequences $A_3$ and $B_3$ will be produced when the respective sine waves exceed the respective voltage levels $V_{A_3}$ and $V_{B_3}$ in the opposite direction. Although there is shown that $$V_{A_2}=V_{-A_3}=V_{B_2}=V_{-B_3}$$

this is for purposes of illustration only. All the levels may, when desired, be of different values without affecting the operation of the phase measurement apparatus. These voltage levels will be used for phase measurement. On the other hand, pulse sequence $A_1$ will be produced by tunnel diode circuit 49 when the amplitude of sine wave A exceeds the voltage level $V_{A_1}$ and pulse sequence $B_1$ will be produced when sine wave B exceeds the voltage level $V_{B_1}$. These voltage levels should be reasonably equal so that $K_1$ and $K_2$ will be approximately equal to 1. Thus, it is desirable, but not absolutely necessary that $V_{A_1} \cong -V_{A_4} \cong V_{B_1} \cong -V_{B_4}$.

FIGURE 7 also illustrates the two aforementioned $R_1$ and $R_2$ arbitrary regions of the sine waves. This is necessary for developing the logic to make phase angle measurements when it is desirable to make the measurement more than once during a period T of the sine wave. Region $R_2$ is defined as the time from the first $B_1$ pulse to the first $B_4$ pulse while region $R_1$ is defined as the time from the first $B_4$ pulse to the first $B_1$ pulse. A portion of region $R_1$ is further illustrated in FIGURE 8.

In total, then, there are eight independent trigger circuits, four for each sine wave of which two are for positive and two are for negative trigger levels. The pulse sequences $A_2$, $A_3$, $B_2$ and $B_3$ are used only in the phase measurement. The pulse sequences $A_1$, $A_4$, $B_1$ and $B_4$ are primarily intended for amplitude determination although levels $B_1$ and $B_4$ are also used to define the two regions of the sine waves $R_1$ and $R_2$, while $A_1$ and $A_4$ pulse sequences are used for the automatic start-stop operation.

The present invention in its preferred embodiment provides means whereby the time delay $\Delta t$ can be made for the negative half cycle of the sine wave inputs A and B as well as the positive half cycle. Since it is possible to have an apparent negative time delay, a $\Delta t_+$ and a $\Delta t_-$ is measured with the true $\Delta t$ obtained from the difference thereof.

The logic circuit $\Delta t_+$ 14 shown comprising four AND gates 64–67 and one OR gate 74 implements the digital measurement of $\Delta t_+$ over the complete cycle of the sine waves A and B. Furthermore, by utilizing the logic circuitry with two synchronized time bases $f_1$ and $f_2$, as shown in FIGURE 9, pulse overlap or confusion is prevented. The first AND gate 64 produces an output of $(A_2 \cdot \overline{B}_2 \cdot f_1 \cdot R_1)$, the second AND gate 65 produces an output of $(\overline{A}_2 \cdot B_2 \cdot f_2 \cdot R_2)$, the third AND gate 66 produces an output of $(A_3 \cdot \overline{B}_3 \cdot f_1 \cdot R_2)$, and the fourth AND gate 67 produces an output of $(\overline{A}_3 \cdot B_3 \cdot f_2 \cdot R_1)$. The OR gate 74 will yield an output at any time an output appears at any of the AND gates 64 through 67. The $\Delta t_+$ counter 17 will count pulses equal to $4\Delta t_+$ each period of the sine wave input. In mathematical terms, the circuitry embodying the $\Delta t_+$ logic mechanizes the equation:

$$\Delta t_+ = \frac{1}{Nf_{\Delta t}} \sum_{i=1}^{4NT/f_{\Delta t}} \{\Gamma_i(A_2 \cdot \overline{B}_2 \cdot f_1 \cdot R_1) + \Gamma_i(\overline{A}_2 \cdot B_2 \cdot f_2 \cdot R_2) + \Gamma_i(A_3 \cdot \overline{B}_3 \cdot f_1 \cdot R_2) + \Gamma_i(\overline{A}_3 \cdot B_3 \cdot f_2 \cdot R_1)\} \quad (5)$$

where $\Gamma_i$ is a function which can during any interval $i$ take on either the value 0 or 1, depending on what the argument of the function is.

FIGURE 9 moreover is a diagram illustrative of the logic $\Delta t_+$. As noted earlier, curves $b$ and $c$ are illustrative of the time bases $f_1$ and $f_2$ having a frequency of 25 kc. and being interlaced so that they are 180° out of phase with respect to one another. Curves $b$, $c$, $d$ and $h$ are illustrative of the pulse sequences $A_2$, $B_2$, $A_3$ and $B_3$, respectively, and are illustrative of the continuously recycling of the respective tunnel diode circuits when the input signals A and B exceed the predetermined voltage levels of the tunnel diode circuits 50, 45, 51 and 46, respectively. Curve $i$ is illustrative of the logic term $(A_2 \cdot \overline{B}_2 \cdot f_1)$ output from the AND gate 64. Likewise, curves $j$, $k$ and $l$ are illustrative of the terms $(\overline{A}_2 \cdot B_2 \cdot f_2)$, $(A_3 \cdot \overline{B}_3 \cdot f_1)$ and $(\overline{A}_3 \cdot B_3 \cdot f_2)$ from AND gates 65, 66 and 67, respectively. By noting the definition of the regions $R_1$ and $R_2$, the curves in FIGURE 9 are illustrative of the time difference $\Delta t_+$ at four different time intervals. It should be noted that during each time base interval, the question is asked in a logic sense, did the respective logic term undergo a 0 to 1 to 0 transition to form a pulse to be counted or did it not? The time base structure $f_1$ and $f_2$ moreover prevents the product from forming more than one pulse per time unit base interval. The time structure also insures that when the middle two or two end terms in the Equation 5 produce pulses during the same unit time interval that they will not overlap.

Because it has been shown that an apparent negative time delay can be produced and that it is therefore necessary to consider a $\Delta t_-$, the $\Delta t_-$ logic circuit 15 comprises a first AND gate 69 which produces an output of $(\overline{A}_3 \cdot B_3 \cdot f_2 \cdot R_2)$ which is in a sense the complementary output to the AND gate 64 of the $\Delta t_+$ logic circuitry 14. In a similar manner, AND gates 70, 71 and 72 produce outputs of $(A_3 \cdot \overline{B}_3 \cdot f_1 \cdot R_1)$, $(\overline{A}_2 \cdot B_2 \cdot f_2 \cdot R_1)$ and $(A_2 \cdot \overline{B}_2 \cdot f_1 \cdot R_2)$, respectively. The output of the OR gate 75 moreover produces a pulse count which is four times the $\Delta t_-$ which is counted in the $\Delta t_-$ counter 19. The $\Delta t_-$ logic circuitry 15 embodies the logic equation:

$$\Delta t_- = \frac{1}{Nf_{\Delta t}} \sum_{i=1}^{4NT/f_{\Delta t}} \{\Gamma_i(\overline{A}_2 \cdot B_2 \cdot f_2 \cdot R_1) + \Gamma_i(A_2 \cdot \overline{B}_2 \cdot f_1 \cdot R_2) + \Gamma_i(\overline{A}_3 \cdot B_3 \cdot f \cdot R_2) + \Gamma_i(A_3 \cdot \overline{B}_3 \cdot f_1 \cdot R_1)\} \quad (6)$$

where $\Gamma_i$ is a function which can during any interval $i$ take on either the value 0 or 1.

It should be noted then that the true time delay $\Delta t$ can be determined by a pulse count of the logic circuit outputs and by Equation 1 which is $\Delta t = \Delta t_+ - \Delta t_-$. However, the difference between counters 17 and 19 provide $\Delta t$ because although the measurement is made four times per cycle there is another factor of four which comes in because $f_{\Delta t}$ is divided by a factor of four, therefore, $$\Delta t = n \quad (7)$$

where $n$ is equal to the difference in pulse count between the $\Delta t_+$ counter 17 and the $\Delta t_-$ counter 19.

It should be borne in mind, however, that in order to make the pulse angle measurement independent of the baseline, the measurement must at least be made at beginning and end of a particular clipping level and then averaged.

The desired phase angle $\delta$ then is:

$$\delta = w\Delta t \frac{2\pi \Delta t}{T} \text{ Radians} \quad (8)$$

where T is the period of the sine waves A and B.

In determining the relative amplitude of the input sine waves A and B, it has been stated earlier that this determination can be made in terms of the clipping level voltages $V_{B1}$, $V_{A1}$, $V_{B4}$, and $V_{A4}$. The pulse sequence of $B_4 + B_4$ is accomplished by coupling the B amplitude counter 18 to the flip-flop circuit 57 which receives inputs from the tunnel diode circuits 44 and 47, respectively, with the pulse output governed by the rate of reset from time base $f_5$. Similarly, the pulse sequence $A_1 + A_4$ is determined by the A amplitude counter 20 coupled to the flip-flop circuit 59 which receives inputs from tunnel diode circuits 49 and 52. Again, the pulse output of $A_1 + A_4$ is governed by the rate of reset time base $f_5$. Since the period T counter 26 is coupled to the AND circuit 122 which has an input of $f_5$ and the start-stop pulses, the period TN for N cycles is simply determined by the logical product of the start-stop line and the time base $f_5$. Knowing the period T, the ratio $A/B$ can be calculated from Equation 4.

It should be noted with respect to the phase angle measurement that the region $R_1$ and $R_2$ definition will break down for large phase angles when the first $B_1$ pulse occurs after the last $A_2$ pulse. In practice, the definitions are adequate to the nominal angle of 120°. Interchanging signals A and B and inverting one of them, i.e., 180° phase shift, the range from 120° to 240° can be covered if the measured phase shift is substracted from 180°. For the nominal range from 160° to 300°, one signal is inverted and its measured phase shift is added to 180°.

In summary, the present invention is capable of high angular resolution since the signal errors in phase angle measurement are reduced by: (1) averaging over high frequency noise; (2) no dependence on the relative base line positions of the two sine waves; (3) compensation for base line drift at least to the extent that it can be linearly approximated; and (4) multiple averaging within one signal cycle as well as averaging over many cycles. Indeed, at ultra-low frequencies, multiple internal averaging can readily be increased thus reducing noise still further.

While there has been shown and described what is at present considered to be the preferred embodiment of the invention, modifications thereto will readily occur to those skilled in the art. It is not desired therefore that the invention be limited to those specific arrangements shown and described but it is to be understood that all equivalents, alterations and modifications within the spirit and scope of the present invention are meant to be included.

What I claim is:

1. Apparatus for the measurement of the time delay between two sinusoidal signals, comprising in combination: first and second input means for respectively receiving said two sinusoidal signals; a time base source generating a series of timing pulses for establishing a predetermined per unit time interval; a first trigger circuit including amplitude level sensing means coupled to said input means and said time base source for generating a first pulse sequence in accordance with said timing pulses whenever the first of said two sinusoidal signals exceeds a first predetermined amplitude level; a second trigger circuit also including amplitude level sensing means coupled to said second input means and said time base source for generating a second pulse sequence in accordance with said timing pulses whenever the second of said two sinusoidal signals exceeds a second predetermined amplitude level; logic circuit means coupled to said first and said second trigger circuit and said time base source for determining, within the time that one of said first and second predetermined amplitude levels are exceeded, the occurrence of said first pulse sequence and the non-occurrence of said second pulse sequence and subsequently the occurrence of said second pulse sequence and the non-occurrence of said first pulse sequence; and pulse counter means coupled to said logic circuit means for counting the total number of pulses resulting from said logic circuit means, since by dividing said total number of pulses by two to average the pulse count and by knowing the per unit time interval of said series of timing pulses, the time delay between said two sinusoidal signals can be determined thereby.

2. Apparatus according to claim 1 wherein said amplitude level sensing means of each said first and said second trigger circuit comprises tunnel diode means having a low voltage state and a high voltage state and each being operable to be responsive to a selected one of two said sinusoidal signals for being triggered from its low voltage state to its high voltage state thereby, including means coupled thereto for being periodically recycled to its low voltage state by said timing pulses from said time base source.

3. Apparatus for the measurement of the time delay between two sinusoidal signals by determining the time delay between selected points thereof, comprising in combination: first and second input means for receiving a first and a second sinusoidal input signal of a predetermined period respectively; a time base source generating timing signals for establishing a predetermined per unit time interval; a first trigger circuit, having amplitude level sensing means, coupled to said first input means and said time base source for generating a first digital pulse sequence in accordance wtih said timing signals whenever said first sinusoidal signal exceeds a first predetermined amplitude level; a second trigger circuit, having amplitude level sensing means, coupled to said second input means and said time base source for generating a second digital pulse sequence in accordance with said timing pulses whenever said second sinusoidal signal exceeds a second predetermined amplitude level; first logic circuit means coupled to said first and said second trigger circuit and said time base source for determining within a first selected portion of the period said first and said second sinusoidal signal when said first pulse sequence occurs and said second pulse sequence does not occur; second logic circuit means coupled to said first trigger circuit and said second trigger circuit and said time base source for determining within a second selected portion of the period said first and said second sinusoidal signal when said second pulse sequence occurs and said first pulse sequence does not occur; and pulse counter means coupled to said first and said second logic circuit means for determining the total number of pulses of said first and said second pulse sequence, the said time delay being determined by knowning the per unit time interval as determined by said timing pulses and dividing the said total number of pulses by a factor of two.

4. Apparatus as defined by claim 3 wherein each said first and said second trigger circuit comprises: an emitter follower limiter circuit coupled to its respective said sinusoidal input signal for limiting the amplitude thereof to its respective predetermined amplitude level; said amplitude sensing means comprises tunnel diode means coupled to said emitter follower limiter circuit, having a low voltage state and a high voltage state, and being operable to be triggered to its high voltage state when the respective input signal reaches said predetermined amplitude level and being adapted to be periodically reset to said low voltage state at predetermined per unit time intervals as determined by said timing signals; and a flip-flop circuit coupled to said tunnel diode means for providing an output representative of the respective said digital pulse sequence and its complement.

5. Electrical apparatus for determining the phase angle between two sine wave input signals comprising in combination: first input means adapted to receive one signal of said two sine wave input signals; second input means adapted to receive the other signal of said two sine wave input signals; a time base circuit operable to provide a first, a second, a third, and a fourth time base signal comprising timing pulses occurring at selected synchronized time intervals, said first and said second time base having substantially the same frequency but being 180° out of phase with respect to one another, said third and said fourth time base having one-half the frequency of said first and said second time base and being 180° out of phase with respect to one another; a first trigger circuit including amplitude level sensing means coupled to said first input means and said time base circuit and being responsive to said one signal and controlled by said first and said third time base signal so that a first pulse sequence and its complement are produced during the positive polarity portion of said one signal when the amplitude thereof exceeds a first predetermined level; a second trigger circuit including amplitude level sensing means coupled to said first input means and said time base circuit and being responsive to said one signal and controlled by said second and said fourth time base signal so that a second pulse sequence and its complement are produced during the negative polarity portion of said one signal when the amplitude thereof exceeds a second predetermined level; a third trigger circuit including amplitude level sensing means coupled to said second input means and said time base circuit and being responsive to said other signal and controlled by said first and said fourth time base signal so that a third pulse sequence and its complement are produced during the positive polarity portion of said other signal when the amplitude thereof exceeds a third predetermined level; a fourth trigger circuit including amplitude level sensing means coupled to said second input means and said time base circuit and being responsive to said other signal and controlled by said second and said third time base signal so that a fourth pulse sequence and its complement are produced during the negative polarity portion of said other signal when the amplitude thereof exceeds a fourth predetermined level; logic circuit means coupled to said first, second, third, and fourth trigger circuit for providing a predetermined logic output pulse sequence at selected four time intervals as determined by said third and fourth time base signals; and counter circuit means coupled to said logic circuit means for determining the total number of pulses contained in said logic output, the desired time difference between said sine waves being the total number of pulses counted by said counter divided by a factor of four, multiplied by said time interval represented by each pulse.

6. Apparatus for measuring the time interval between sine waves at a predetermined amplitude level comprising: input means for receiving a first and a second sine wave; time base means for providing a synchronized time base of signals to establish a per unit time interval; first and second trigger circuit means including amplitude sensing means coupled to said input means and said time base means to digitalize said first and said second sine wave input in accordance with said per unit time interval when the amplitude thereof reaches predetermined amplitude levels of both positive and negative polarities forming a respective pulse sequence thereat as a function of said per unit time interval; logic means coupled to said first and second circuit means providing an output pulse sequence at selected time intervals during both positive and negative polarities to determine the mutually exclusive time interval during which one respective pulse sequence occurs but not another; and pulse counter means coupled to said logic means being operable to count the total number of pulses appearing at said selected time intervals, the time interval between said first and said second sine wave being the total number of pulses counted divided by the number of selected number of time intervals multiplied by said per unit time interval.

7. Apparatus for measuring the time interval between a selected amplitude level of two sine waves comprising in combination: first and second input means adapted to receive a first and a second sine wave respectively; a time base circuit section for generating four synchronized pulse time base signals $f_1$, $f_2$, $f_3$, and $f_4$; a first voltage level detector circuit being responsive to positive polarity input signals, coupled to said first input means and said time base section, for producing a first pulse signal under the continuous reset control of time base $f_3$ when the amplitude of said first sine wave reaches a first predetermined magnitude; a first flip-flop circuit coupled to said first voltage level detector circuit and said time base section for providing an output $A_2$ and its complement $\overline{A}_2$ under the control of time base $f_2$; a second voltage level detector circuit being responsive to negative input signals coupled to said first input means and said time base section, for producing a second pulse signal under the continuous reset control of time base $f_4$ when the amplitude of said first sine wave reaches a second predetermined magnitude; a second flip-flop circuit coupled to said second voltage level detector circuit and said time base section for providing an output $A_3$ and its complement $\overline{A}_3$ under the continuous reset control of time base $f_1$; a third voltage level detector circuit being responsive to positive polarity input signals, coupled to said second input means and said time base section, for producing a third pulse signal under the continuous reset control of time base $f_3$ when the amplitude of said second sine wave reaches a third predetermined magnitude; a third flip-flop circuit coupled to said third voltage level detector and said time base section for providing an output $B_2$ and its complement $\overline{B}_2$ under the continuous reset control of time base $f_1$; a fourth voltage level detector circuit being responsive to negative polarity input signals, coupled to said second input means and said time base section, for producing a fourth pulse signal under the continuous reset control of time base $f_4$ when the amplitude of said second sine wave reaches a fourth predetermined magnitude; a fourth flip-flop circuit coupled to said fourth voltage level detector circuit and said time base section for providing an output $B_3$ and its complement $\overline{B}_3$ under the continuous reset control of time base $f_2$; logic circuit means coupled to said aforementioned flip-flop circuits and said time base section for providing a pulse output during a first region $R_1$ and a second region $R_2$ of said first and second sine waves according to the logic equation:

$$\Delta t = \Delta t_+ - \Delta t_-$$

where $$\Delta t_+ = \frac{1}{Nf_{\Delta t}} \sum_{i=1}^{4NT/f_{\Delta t}} \{\Gamma_i(A_2 \cdot \overline{B}_2 \cdot f_1 \cdot R_1) + \Gamma_i(\overline{A}_2 \cdot B_2 \cdot f_2 \cdot R_2) + \Gamma_i(A_3 \cdot \overline{B}_3 \cdot f_1 \cdot R_2) + \Gamma_i(\overline{A}_3 \cdot B_3 \cdot f_2 \cdot R_1)\}$$

and $$\Delta t_- = \frac{1}{Nf_{\Delta t}} \sum_{i=1}^{4NT/f_{\Delta t}} \{\Gamma_i(\overline{A}_2 \cdot B_2 \cdot f_2 \cdot R_1) + \Gamma_i(A_2 \cdot \overline{B}_2 \cdot f_1 \cdot R_2) + \Gamma_i(\overline{A}_3 \cdot B_3 \cdot f_2 \cdot R_2) + \Gamma_i(A_3 \cdot \overline{B}_3 \cdot f_1 \cdot R_1)\}$$

and where $\Gamma_i$ is a function which can during any interval $i$ take on either the value 0 or 1, N is the number of signal cycles, and $f_{\Delta t}$ is a frequency functionally related to $f_1$, $f_2$, $f_3$ and $f_4$; counter means coupled to said logic circuit for determining the number of pulses indicative of $\Delta t$ between said first and said second sine wave; and start-stop circuit means coupled to said time base circuitry for providing both manual and automatic control of said apparatus.

8. Apparatus as defined in claim 7 wherein said logic circuitry comprises: a first, a second, a third and a fourth AND gate coupled to said first, second, third and fourth flip-flop circuit and said time base section; and a first OR gate coupled to said first, second, third and fourth AND gates for providing the $\Delta t_+$ portion of said logic equation; a fifth, a sixth, a seventh, and an eighth AND gate coupled to said first, second, third, and fourth flip-flop circuit and said time base section; and a second OR gate coupled to said fifth, sixth, seventh and eighth AND gates for providing the $\Delta t_+$ portion of said logic equation.

9. Apparatus as defined in claim 7 wherein said logic circuitry comprises a first AND gate coupled to said first and said third flip-flop and said time base $f_1$ for providing an output $(A_2 \cdot \overline{B}_2 \cdot f_1 \cdot R_1)$; a second AND gate coupled to said first and said third flip-flop circuit and the time base $f_2$ for providing an output $(\overline{A}_2 \cdot B_2 \cdot f_2 \cdot R_2)$; a third AND gate coupled to said second flip-flop and said fourth flip-flop circuit and said time base $f_1$ for producing an output $(A_3 \cdot \overline{B}_3 \cdot f_1 \cdot R_2)$; a fourth AND gate coupled to said second flip-flop and said fourth flip-flop and said time base $f_2$ for producing an output $$(\overline{A}_3 \cdot B_3 \cdot f_2 \cdot R_1)$$

and an OR gate coupled to said aforementioned AND gates for providing a cumulative output signal.

10. Apparatus as defined in claim 7 wherein said first and said third voltage level detector circuit comprises: a tunnel diode; a transistor of first type conductivity coupled to said tunnel diode so as to produce an emitter follower limiter circuit; circuit means coupled to said tunnel diode for coupling said time base $f_3$ thereto for providing a periodic recycling negative reset voltage; and another transistor of said first type conductivity coupled to said tunnel diode circuit for amplifying signals applied to said tunnel diode circuit for driving a respective flip-flop circuit.

11. Apparatus as defined in claim 7 wherein said second and said fourth voltage level detector circuit comprises: a tunnel diode; a transistor of a second type conductivity coupled to said tunnel diode so as to produce an emitter follower limiter circuit; circuit means coupled to said tunnel diode, for applying said time base $f_4$ thereto for providing a periodic recycling positive reset signal; and another transistor of said second type conductivity coupled to said tunnel diode for amplifying signals applied to said tunnel diode circuit for driving a respective flip-flop circuit.

12. Apparatus for measuring the amplitude ratio of two sinusoidal signals comprising in combination: first and second input means for respectively receiving each of said two sinusoidal signals; first and second trigger circuit means including amplitude level sensing means coupled to said first input means and adapted to be responsive to the positive and negative half cycle, respectively, of one signal of said two sinusoidal signals, said first trigger circuit being responsive to said positive half cycle and said second trigger circut being responsive to said negative half cycle, said first and said second trigger circuit being operable to produce a respective output signal comprising a pulse sequence whenever said one signal exceeds a predetermined amplitude level of positive and negative polarity, respectively; time base circuit means coupled to said first and second trigger circuits for resetting said trigger circuits at selected time intervals; third and fourth trigger circuit means including amplitude level sensing means coupled to said second input means and adapted to be responsive to the positive and negative half cycle, respectively, of the other signal of said two sinusoidal signals, said third trigger circuit being responsive to the positive half cycle and said fourth trigger circuit being responsive to the negative half cycle, said third and fourth trigger circuits being operable to produce a respective output signal comprising a pulse sequence whenever said other signal reaches a predetermined amplitude level of positive and negative polarity, respectively; means coupling said time base circuit means to said third and fourth trigger circuit means for resetting said trigger circuits at selected time intervals; a first flip-flop circuit coupled to said first and said second trigger circuit; another time base circuit coupled to said first flip-flop circuit for resetting said flip-flop circuit at preselected intervals for establishing a per unit time interval; a second flip-flop circuit coupled to said third and said fourth trigger circuit and said another time base circuit, said first flip-flop and said second flip-flop circuits providing output pulse sequences corresponding to said per unit time interval whenever said one and said other of said two sinusoidal signals reach said predetermined amplitude levels; first counter means coupled to said first flip-flop circuit for determining the number of pulses in the output pulse sequence from said first flip-flop circuit; and second pulse counter means coupled to said second flip-flop circuit for determining the number of pulses in the output pulse sequence from said second flip-flop circuit, the desired amplitude ratito being determined by the respective time interval spent by each of said two sinusoidal signals above said predetermined levels.

13. Apparatus as defined by claim 12 wherein each said trigger circuit comprise: an emitter follower limiter circuit; a tunnel diode having a low voltage state and a high voltage state coupled to said emitter follower limiter circuit, including means for being reset at selected time intervals into said low voltage state by said time base circuit, and being triggered to its high voltage state whenever a respective sinusoidal signal exceeds a respective said predetermined amplitude level, providing a stable level detector thereby.

14. Apparatus for measuring the amplitude ratio of a first and a second sinusoidal signal comprising in combination: first input means for receiving said first sinusoidal signal; second input means for receiving said second sinusoidal signal; a first and second time base circuit; a first tunnel diode trigger circuit including amplitude level sensing means coupled to said first input means and said first time base circuit, said tunnel diode circuit adapted to have a low voltage state and a high voltage state, and being reset at selected time intervals by the first time base circuit, being responsive to positive polarity signals and operable to produce an output signal comprising a first pulse sequence whenever said first sinusoidal signal exceeds a predetermined amplitude level; a second tunnel diode trigger circuit including amplitude level sensing means coupled to said first input means and said second time base circuit, being reset at selected time intervals thereby, and adapted to be responsive to negative polarity input signals and operable to produce an output signal comprising a second pulse sequence whenever said first sinusoidal signal exceeds a second predetermined amplitude substantially equal to said first predetermined amplitude level but opposite in polarity; a third tunnel diode trigger circuit including amplitude level sensing means coupled to said second input means and said first time base circuit, being reset at selected time intervals thereby, and adapted to be responsive to the positive polarity signal of said second sine wave and operable to produce an output signal comprising a third pulse sequence whenever said second sinusoidal signal exceeds a third amplitude level substantially equal to said first predetermined voltage level; a fourth tunnel diode trigger circuit means including amplitude level sensing means coupled to said second input means and said second time base circuit, being reset at selected time intervals thereby, and being responsive to the negative polarity signal of said second sinusoidal signal and operable to produce an output signal comprising a fourth pulse sequence whenever said second sinusoidal signal exceeds a fourth amplitude level substantially equal to said second predetermined level; a first flip-flop circuit coupled to said first and said second tunnel diode circuit; a second flip-flop circuit coupled to said third and fourth tunnel diode circuits; a third time base circuit coupled to said first and said second flip-flop circuits for gating out said first, second, third and fourth pulse sequence in predetermined per unit time intervals; counter means coupled to said first flip-flop circuit for determining the time interval wherein said first sinusoidal signal exceeds said first and second predetermined level by counting said first and second pulse sequence; and second counter means coupled to said second flip-flop circuit for determining the time interval wherein said second sinusoidal signal exceeds said first and said second predetermined level by counting said third and fourth pulse sequence, the amplitude ratio being determined by the ratio of said time interval of said first sinusoidal signal to the time interval of said second sinusoidal signal.

References Cited by the Examiner
UNITED STATES PATENTS

| | | | |
|---|---|---|---|
| 2,851,596 | 9/1958 | Hilton. | |
| 3,015,064 | 12/1961 | Husted et al. | 324—83 |
| 3,191,065 | 6/1965 | Vargiu | 328—151 X |
| 3,218,479 | 11/1965 | Webb | 324—83 X |

WALTER L. CARLSON, *Primary Examiner.*

P. F. WILLE, *Assistant Examiner.*